United States Patent
Choi et al.

(10) Patent No.: US 8,531,053 B2
(45) Date of Patent: Sep. 10, 2013

(54) VARIABLE VOLTAGE CONTROL SYSTEM AND METHOD FOR HYBRID VEHICLE

(75) Inventors: Yongkak Choi, Seoul (KR); Sungtae Kim, Gyeonggi-do (KR); Kumlim Choi, Seoul (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 898 days.

(21) Appl. No.: 12/629,205

(22) Filed: Dec. 2, 2009

(65) Prior Publication Data

US 2011/0025127 A1  Feb. 3, 2011

(30) Foreign Application Priority Data

Jul. 30, 2009  (KR) .................. 10-2009-0069834

(51) Int. Cl.
    *B60L 1/00*  (2006.01)
(52) U.S. Cl.
    USPC ....... 307/9.1; 307/10.1; 320/104; 180/65.265
(58) Field of Classification Search
    USPC ................... 307/9.1, 10.1; 320/104; 290/40; 180/65.265
    See application file for complete search history.

(56) References Cited

U.S. PATENT DOCUMENTS

| | | | | |
|---|---|---|---|---|
| 4,930,567 | A | * | 6/1990 | Akabane et al. ............. 165/202 |
| 5,334,926 | A | * | 8/1994 | Imaizumi ...................... 320/104 |
| 6,459,170 | B1 | * | 10/2002 | Tamai et al. ...................... 307/48 |
| 6,578,649 | B1 | * | 6/2003 | Shimasaki et al. ........ 180/65.225 |
| 6,630,810 | B2 | * | 10/2003 | Takemasa et al. ............. 320/104 |
| 7,215,034 | B2 | * | 5/2007 | Hino et al. ................... 290/40 C |
| 2004/0135434 | A1 | * | 7/2004 | Honda ............................ 307/9.1 |
| 2006/0036883 | A1 | * | 2/2006 | Hashizumi et al. ............ 713/300 |
| 2007/0255477 | A1 | * | 11/2007 | Okuda et al. .................... 701/93 |
| 2010/0050671 | A1 | * | 3/2010 | Kahn et al. ....................... 62/190 |

FOREIGN PATENT DOCUMENTS

| | | |
|---|---|---|
| JP | 2008-007003 A | 1/2008 |
| KR | 10-2003-0051262 | 6/2003 |
| KR | 10-2008-0014395 | 2/2008 |
| KR | 10-2008-0054286 | 6/2008 |
| KR | 10-0867795 | 11/2008 |
| KR | 10-2008-0111194 A | 12/2008 |

* cited by examiner

*Primary Examiner* — Jared Fureman
*Assistant Examiner* — Alfonso Perez Borroto
(74) *Attorney, Agent, or Firm* — Edwards Wildman Palmer LLP; Peter F. Corless

(57) ABSTRACT

A system for controlling voltage to be supplied to electronic devices in a hybrid vehicle that includes: a main battery for storing power to be supplied to a motor of the vehicle; a sub-battery for storing power to be supplied to electronic devices of the vehicle; a low-voltage DC/DC converter (LDC) for converting a high voltage of the main battery into a low voltage and providing the low voltage to the sub-battery and the electronic devices; and a power controller for controlling power of the main battery, the LDC, and the sub-battery. The power controller controls the voltage to be supplied to the electronic devices with a low voltage, a reference voltage higher than the low voltage, and a high voltage higher than the reference voltage in accordance with an idle stop state, a constant velocity traveling state, an acceleration state, and a deceleration state of the vehicle.

4 Claims, 10 Drawing Sheets

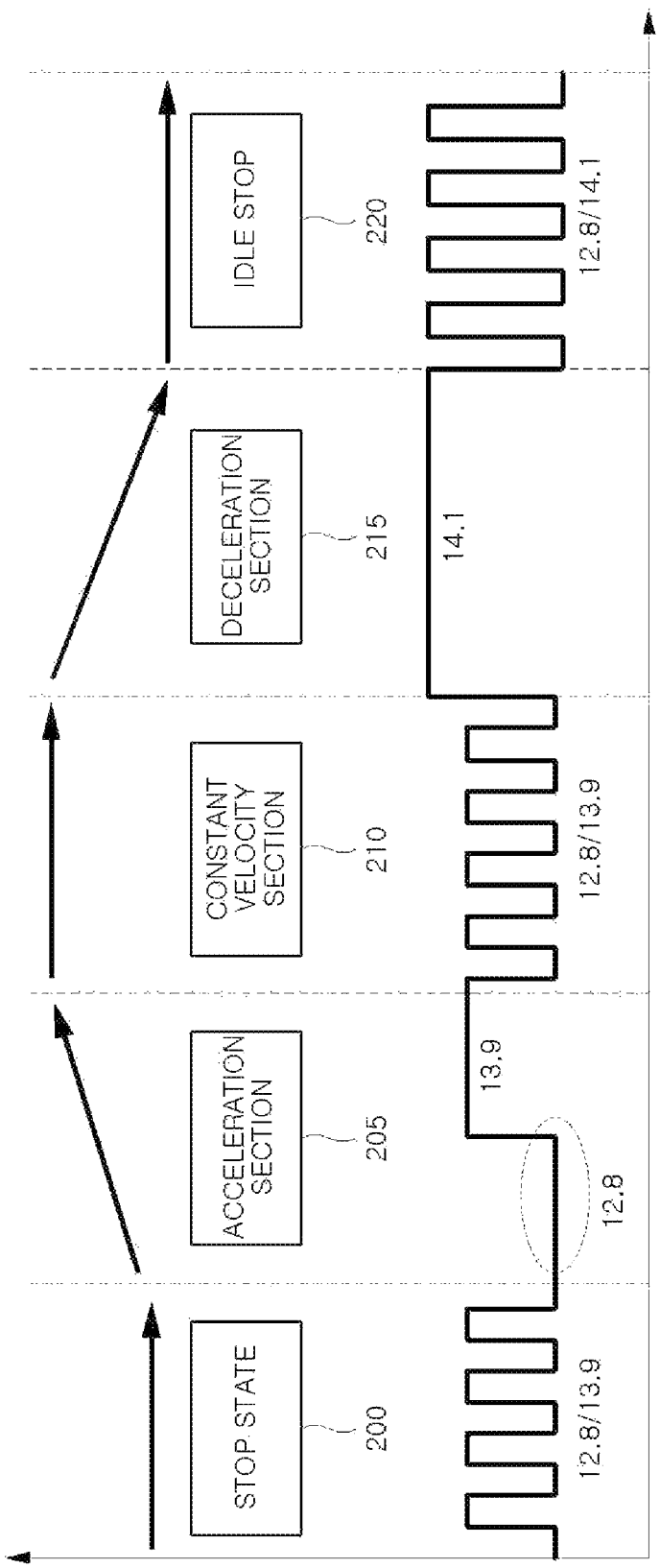

VARIABLE VOLTAGE CONTROL SYSTEM AND METHOD FOR HYBRID VEHICLE

CROSS-REFERENCE TO RELATED APPLICATIONS

The present application claims priority to Korean Patent Application No. 10-2009-0069834 filed Jul. 30, 2009, the entire contents of which application is incorporated herein for all purposes by this reference.

BACKGROUND

1. Technical Field

The present disclosure relates to a variable voltage control system and method for a hybrid vehicle that can improve fuel efficiency.

2. Related Art

In general, a hybrid electric vehicle (HEV), as shown in FIG. 1, includes an engine, a motor directly connected to the engine as the main driving source of the vehicle, a clutch and a transmission for power transmission, an inverter that drives the engine and the motor etc., a DC/DC converter, and a high-voltage battery. It further includes a hybrid controller, a motor controller, a battery controller, an ECU for engine control, and a TCU for transmission control, which are connected to communicate with each other by CAN communication.

The hybrid controller is a higher-class controller that generally controls all operations in the hybrid vehicle while directly or indirectly communicating with one or more lower-class controllers. For example, it may control the torque, speed, and the amount of power generation torque of the motor while communicating with the motor controller in a predetermined way. It may also perform relay control and detect a fault related to engine start while communicating with the ECU in a predetermined way.

Further, the hybrid controller may detect the temperature, voltage, current, and SOC (State of Charge) of the battery, control the torque and speed of the motor in accordance with the SOC while communicating with the battery controller, and maintain the velocity desired by a driver while communicating the TCU.

Further, the hybrid controller may control the output voltage of the DC/DC converter to efficiently distribute energy according to the conditions of the vehicle, while monitoring the requirement information (accelerator, brake) of the driver and the present conditions of the controllers (MCU, BMS, ECU, TCU) such that the DC/DC converter makes it possible to supply power corresponding to an electric device load of the vehicle and effectively charge a 12V-battery.

The high-voltage battery can provide power to drive the motor and DC/DC converter, and the battery controller may adjust the amount of charge of the high-voltage battery while monitoring the voltage, current, temperature of the high-voltage battery.

In connection with control of the DC/DC converter, the ECU and the TCU may receive the amount of accelerator-down and a brake signal and provide information to the hybrid controller to determine the charge energy of the vehicle.

With the above-described configuration, the fuel efficiency can be increased and the exhaust performance can be improved.

On the other hand, hybrid vehicles are generally equipped with an alternator for charging the battery. A typical alternator in the art function to set and output a reference voltage according to the ambient temperature and RPM so as to maintain a high, constant voltage for preventing discharge of a sub-battery. When voltage drop occurs for a predetermined time period, the alternator controls the reference voltage to be increased by increasing RPM. In addition, it controls RPM or the engine torque to be increased by generating a specific signal corresponding to high electric device load.

In case of hybrid vehicles equipped with such an alternator, errors or failure may be generated in the operation of headlamps or wipers since only a sub-battery deals with the electric device loads at the time of entering an idle stop. Further, efficiency of the alternator may be deteriorated in a high RPM region. Also, the fuel efficiency is adversely affected by the load of the alternator during acceleration. In addition, a battery temperature sensor and a device for monitoring voltage are required for variable voltage control, which requires additional cost.

The information disclosed in this Background section is only for enhancement of understanding of the general background of the invention and should not be taken as an acknowledgement or any form of suggestion that this information forms the prior art already known to a person skilled in the art.

BRIEF SUMMARY OF THE DISCLOSURE

It is an object of the present invention to provide a variable voltage control system and method for a hybrid vehicle that can control voltages to be supplied to electronic devices of the vehicle while preventing discharge of the sub-battery to thereby optimize fuel efficiency.

An aspect of the present invention provides a variable voltage control system for a hybrid vehicle. The system comprises a main battery, a sub-battery, a low-voltage DC/DC converter (LDC), and a power controller. The main battery may store high-voltage power to be supplied to a motor of the vehicle. The sub-battery may store low-voltage power to be supplied to electronic devices of the vehicle. The LDC may convert the high-voltage power of the main battery into the low-voltage power to be supplied to the electronic devices. The power controller may control the main battery, the LDC, and the sub-battery. In particular, the power controller may perform variable voltage control using a low voltage, a reference voltage higher than the low voltage, and a high voltage higher than the reference voltage in accordance with an idle stop state, a constant velocity traveling state, an acceleration state, and a deceleration state of the vehicle.

The above and other features of the present invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

FIG. 2 illustrates an example of the operation of the variable voltage control system according to the present invention.

DETAILED DESCRIPTION

Figure 1:
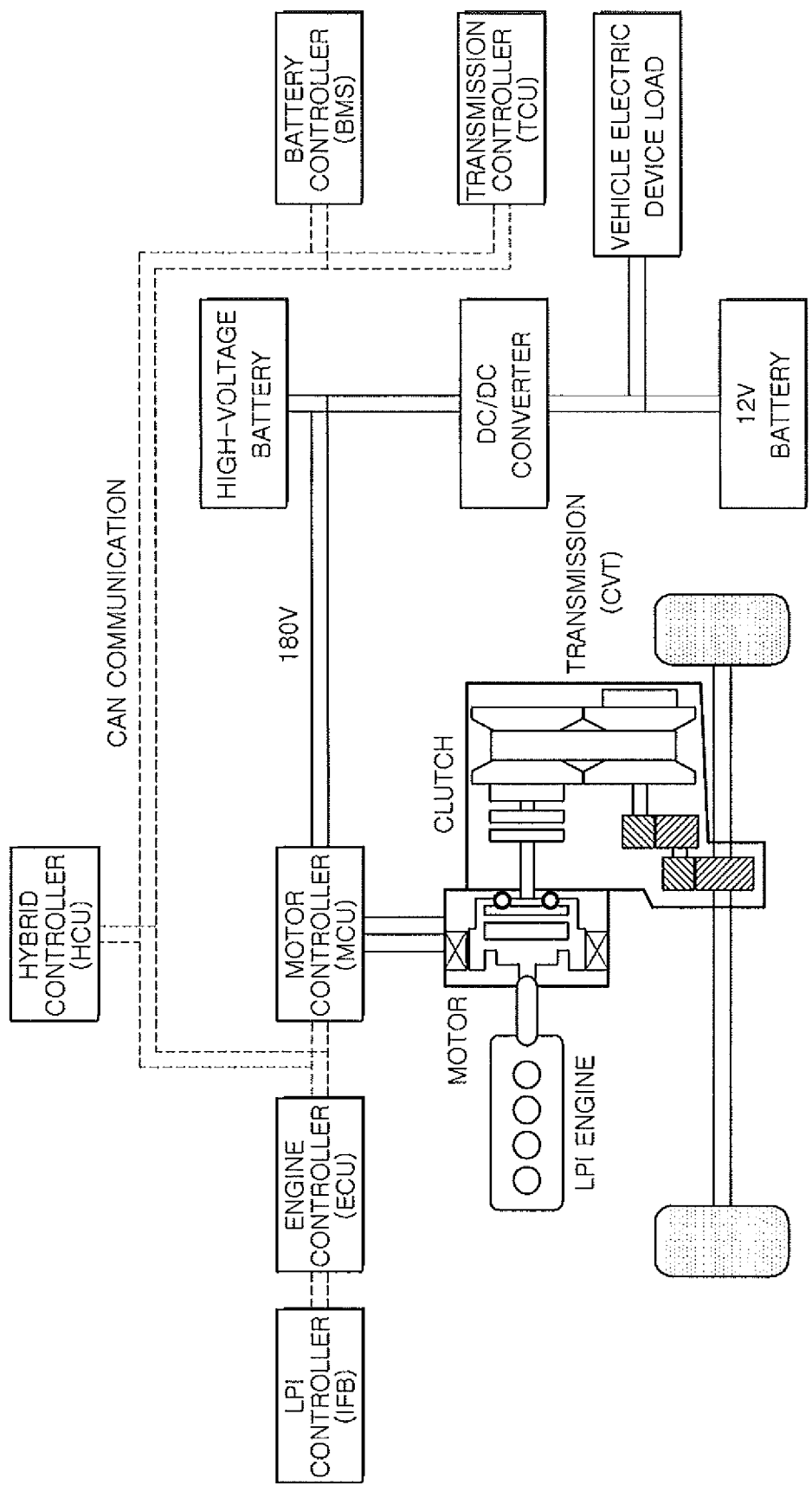
FIG. 1 is a system configuration diagram of a general hybrid vehicle.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 2-7B, variable voltage control systems and methods for a hybrid vehicle according to embodiments of the present invention are described. The methods and systems control the voltage to be supplied to electronic devices of the vehicle according to the traveling conditions of the vehicle.

As shown in FIG. 2, the traveling state of a hybrid vehicle can be divided into an idle/stop state, an acceleration state, a constant velocity state, and a deceleration state. The idle/stop state refers to a state where the vehicle is stopped and the engine is also stopped. The acceleration state refers to a state where the vehicle velocity increases. The constant velocity state refers a state where the vehicle velocity is constant. The deceleration state refers to a state where the vehicle velocity decreases.

In the stop state (idle/stop state) corresponding to the section 200 of FIG. 2, the engine is not operated and the alternator is not operated. Accordingly, since the power to operate head lamps, window wipers, and other electric devices of the vehicle is not sufficient, errors or malfunction can occur.

According to the present invention, in the idle/stop state, it is controlled such that the main battery supplies power to electric device through a Low Voltage DC/DC converter (LDC). In order to prevent discharge of a sub-battery of the vehicle, a control is performed at a low voltage that does not allow the discharge of the sub-battery. The low voltage may be, e.g., 12.8V, but the present invention is not limited thereto. In the present invention, the control is performed alternately at the low voltage and a reference voltage higher than the low voltage. The reference voltage may be, e.g., 13.9V, but the present invention is not limited thereto. Since power is controlled to be supplied from the main battery even in the idle/stop, the sub-battery will not be discharged. Further, by alternating the low voltage and the reference voltage, it is possible to improve the energy efficiency and fuel efficiency as compared with the related art, which outputs only at the reference voltage. Also, by alternating the voltages, the charging efficiency is increased as compared with the related art where a constant voltage is outputted.

In the acceleration state corresponding to the section 205 of FIG. 2, LDC power generation control is performed. When a load of a vehicle is generated, the generated load is calculated as the amount of power consumption of the LDC, and corresponding amount of power is generated by using the motor connected to the engine. The generated energy is not used to charge the main battery, but directly supplied to the electric device load through the LDC. Since the process of charging the main battery is omitted, it is possible to reduce energy loss. The LDC power generation control is also used to balance the SOC of the main battery, and when the SOC is high, the LDC power generation control is turned off and the power loss of the electric device load is dealt with only by the energy of the main battery.

Meanwhile, since power is generated by the motor when the LDC power generation control is used, the fuel efficiency may not be maximal. According to the present invention, the factors that can reduce the fuel efficiency in the acceleration state are removed by turning off the LDC power generation control, and required power is obtained by the energy of the main battery. Further, the energy use of the main battery is maximally reduced by performing a control at a low voltage (e.g. 12.8V). However, in case of a large electric device load (e.g. over 300 W), performing a control only at a low voltage is not enough. As a result, as shown in FIG. 2, a control is performed at the low voltage (e.g., 12.8V) by the energy of the main battery when the electric device load is low and is performed at the reference voltage (e.g., 13.9V) when the electric device load increases.

In the constant velocity state corresponding to the section 210 of FIG. 2, a control is performed at the low voltage for a first predetermined time and at the reference voltage for a second predetermined time that may be identical to or different from the first predetermined time, such that the fuel efficiency is improved as compared with a vehicle in which a control is performed only at the reference voltage. According to the present invention, it is possible to generate and use desired amount of power by monitoring the electric device load of the vehicle. There may be numerous methods of monitoring the electric device load. For example, when the electric device load is generated, the electric device load can be monitored by cutting the output of the main battery and measuring the power supplied to the electric device load.

In the deceleration state corresponding to the section 215 of FIG. 2, power is generated by recycling braking using a motor. According to the present invention, both the main battery and the sub-battery are charged by the generated power, and the power from the main battery and the sub-battery is supplied to the electric device load. Accordingly, a high-voltage control (e.g. 14.1V) is performed.

On the other hand, it is possible to check the condition of the sub-battery, and for this, the amount of power consumption of the vehicle is calculated from a value of power consumption amount calculated in advance, by receiving a signal of a vehicle part having a large electric device load. Also, it is possible to check the condition of the sub-battery by comparing a value obtained by monitoring the amount of present power consumption of the LDC with thus-obtained amount of power consumption of the vehicle.

In the deceleration state corresponding to the section 220 of FIG. 2, which is similar to the stop state (idle/stop state) corresponding to the section 200, in case that the sub-battery requires to be charged, it is possible to perform the alternate control between a low voltage and a reference voltage.

The systems and methods for variable voltage control are described in more detail below with reference to FIGS. 3 to 6.

Figure 3A:
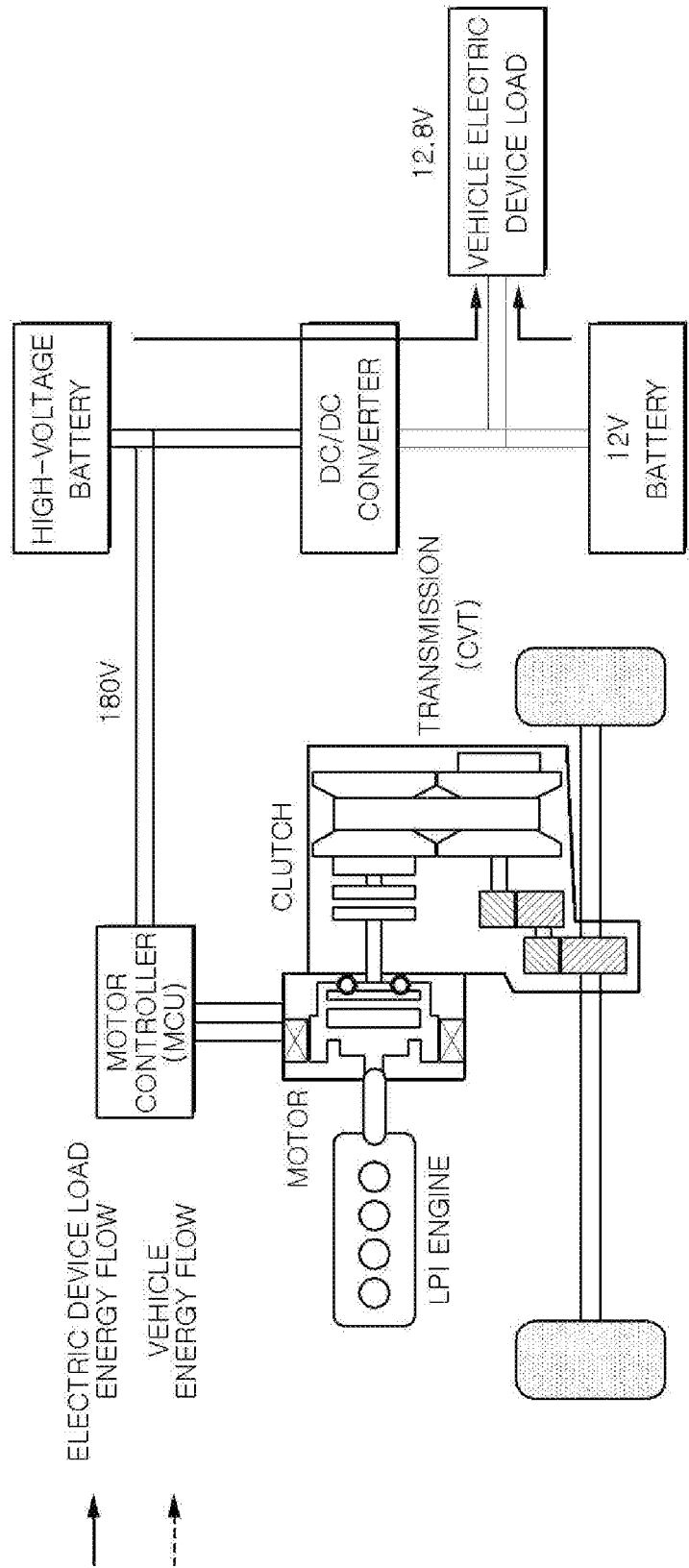
FIG. 3 illustrates an electric device load energy flow and a vehicle energy flow, when the vehicle is in an idle stop state, according to the present invention.
Figure 3B:
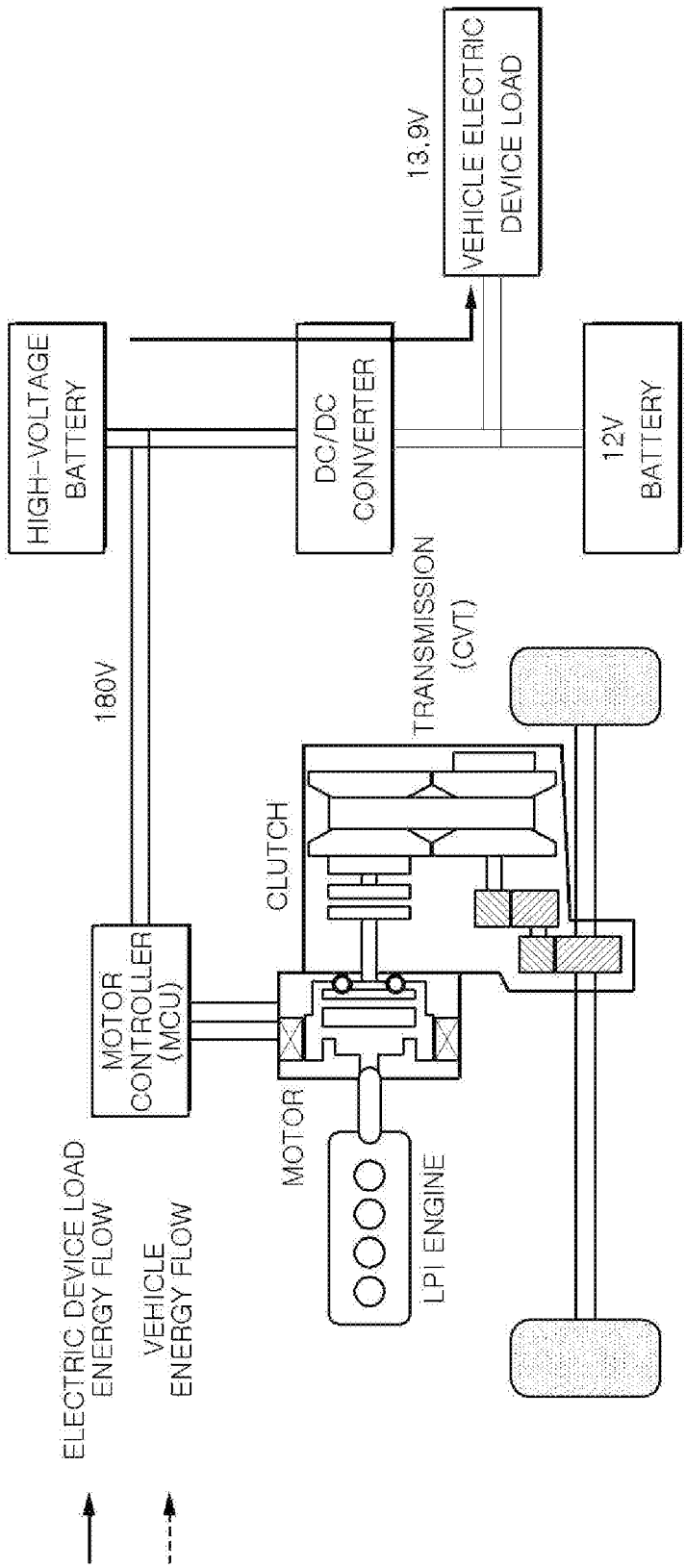

Referring to FIG. 3, in the idle/stop state, since the engine is stopped, charging is not performed. Accordingly, the energy only from the sub-battery is insufficient to deal with the electric device load. According to the present invention, to compensate the energy deficiency, the main battery (high-voltage battery) also supplies energy to the electric device load through the LDC. In this operation, a control is performed at a low voltage where discharge of the sub-battery does not occur. In general, the low voltage may be, e.g., 12.8V, but the present invention is not limited thereto. As discussed above, the control is performed alternately at the low voltage and a reference voltage higher than the low voltage, such as 13.9V. During the control at the reference voltage, energy is supplied to the electric device load of the vehicle by the main battery and sub-battery, and a main battery (high-voltage battery) can be used for charging when the remain of the sub-battery is small. A high-voltage battery can be used for charging when the remain of the sub-battery is small. The alternate voltage control can be performed in various ways. As an example, alternating the low voltage and the reference voltage can be performed by adjusting the output voltage by the DC/DC converter. As another example, it can be performed by forming a switch or a circuit to the input/output terminals of the sub-battery. Preferably, the control can be performed by a separate controller. Also preferably, it can be performed by the BMS, ECU, or other existing controllers.

Referring to FIG. 4, in the constant velocity traveling state, a low voltage and a reference voltage are alternately controlled. The main battery can be charged in the constant velocity traveling state. Therefore, the energy generated to charge the main battery can be directly supplied to the electric device load. Accordingly, since the process of charging and discharging is omitted, energy efficiency can be increased.

Figure 4A:
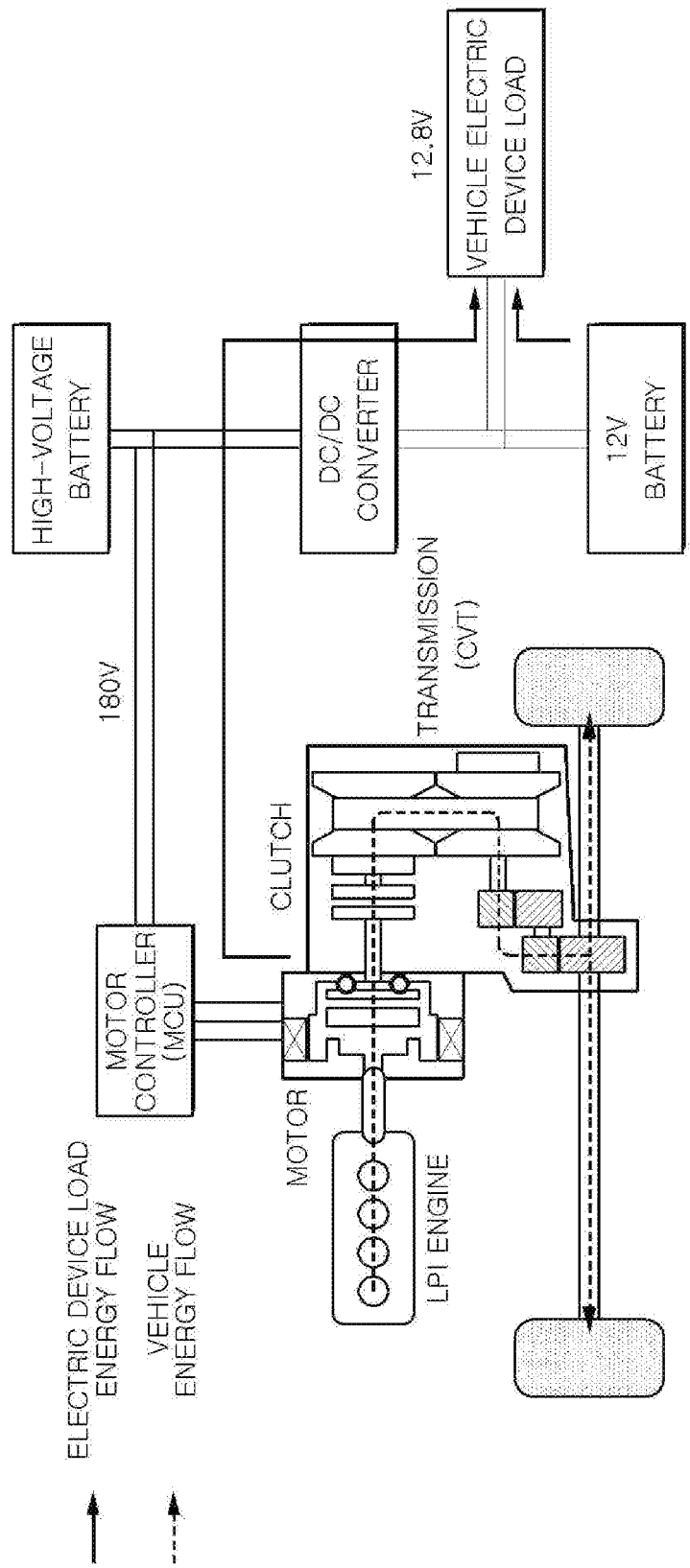
FIG. 4 illustrates an electric device load energy flow and a vehicle energy flow, when the vehicle is in a constant velocity traveling state.

As shown in the diagram of a low-voltage control (12.8V) of FIG. 4A, the energy supplied to the electric device load may be the energy of the sub-battery generated by the motor when the low-voltage control is performed in the constant velocity traveling state. Further, energy can be supplied by a high-voltage battery.

Figure 4B:
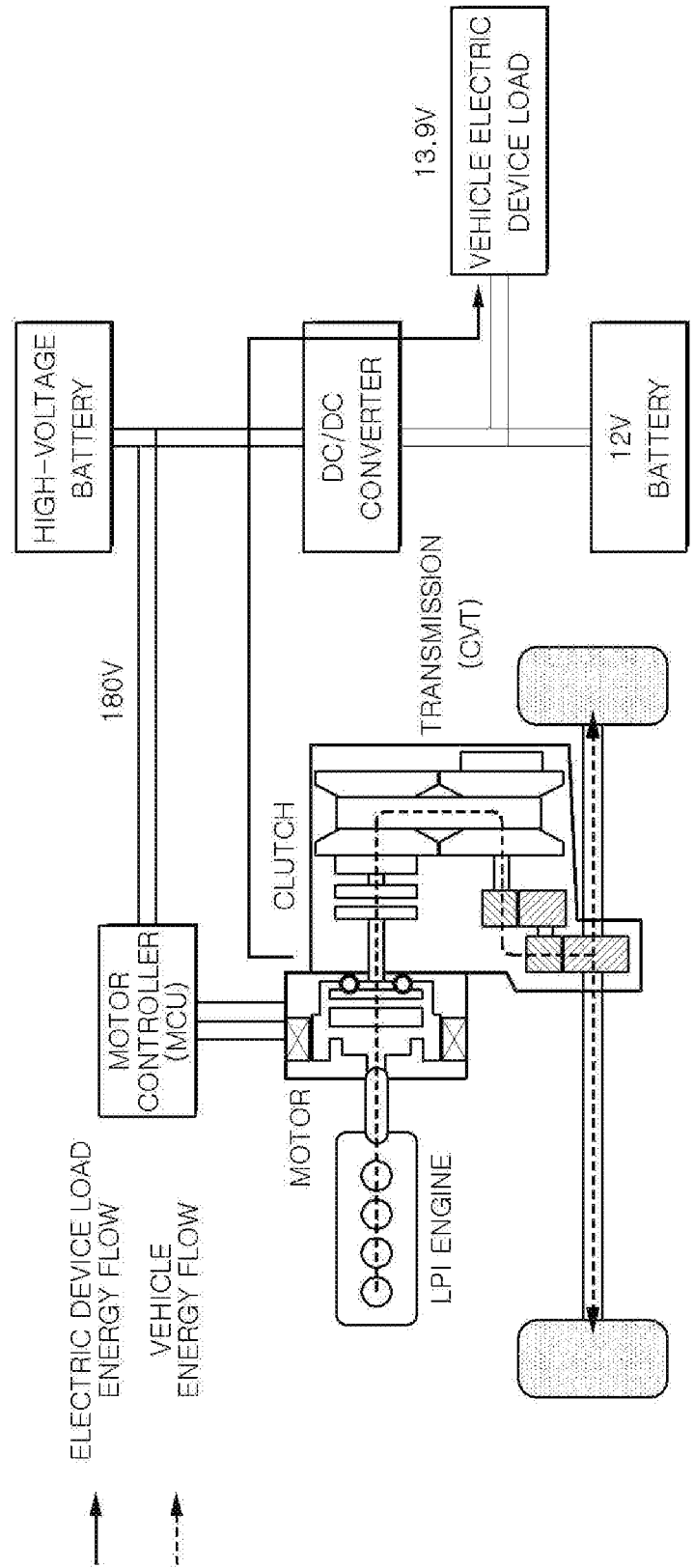

On the other hand, as shown in the diagram of a reference-voltage control (13.9V) of FIG. 4B, the energy generated by the motor is supplied to the electric device load when the reference-voltage control is performed. In this operation, the sub-battery may also be charged, or energy may be supplied to the electric device load from the main battery or the sub-battery, when the remaining battery is sufficient.

Figure 5:
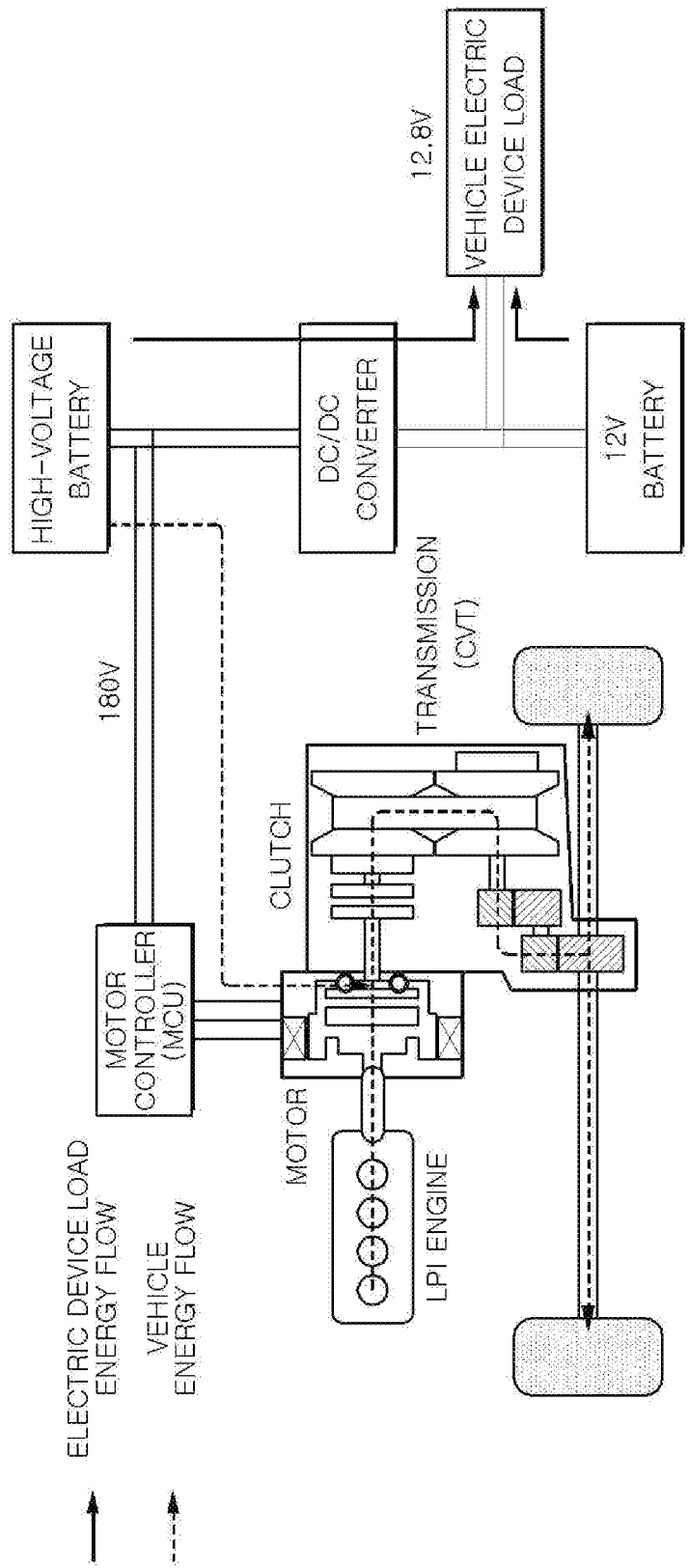
FIG. 5 illustrates an electric device load energy flow and a vehicle energy flow, when the vehicle is in an acceleration state.

Referring to FIG. 5, in the acceleration state, the power of the main battery is used to accelerate the motor. Therefore, in order to reduce the power consumption as much as possible, a low voltage is supplied to the electric device load of the vehicle. That is, the energy of the main battery and the sub-battery is supplied at a low voltage to the electric device load. In the low-voltage control described above, it is possible to reduce the entire energy consumption by reducing the use of energy of the main battery. However, when the electric device load of the vehicle is large (e.g. 300 W or higher), the reference voltage is maintained.

Figure 6:
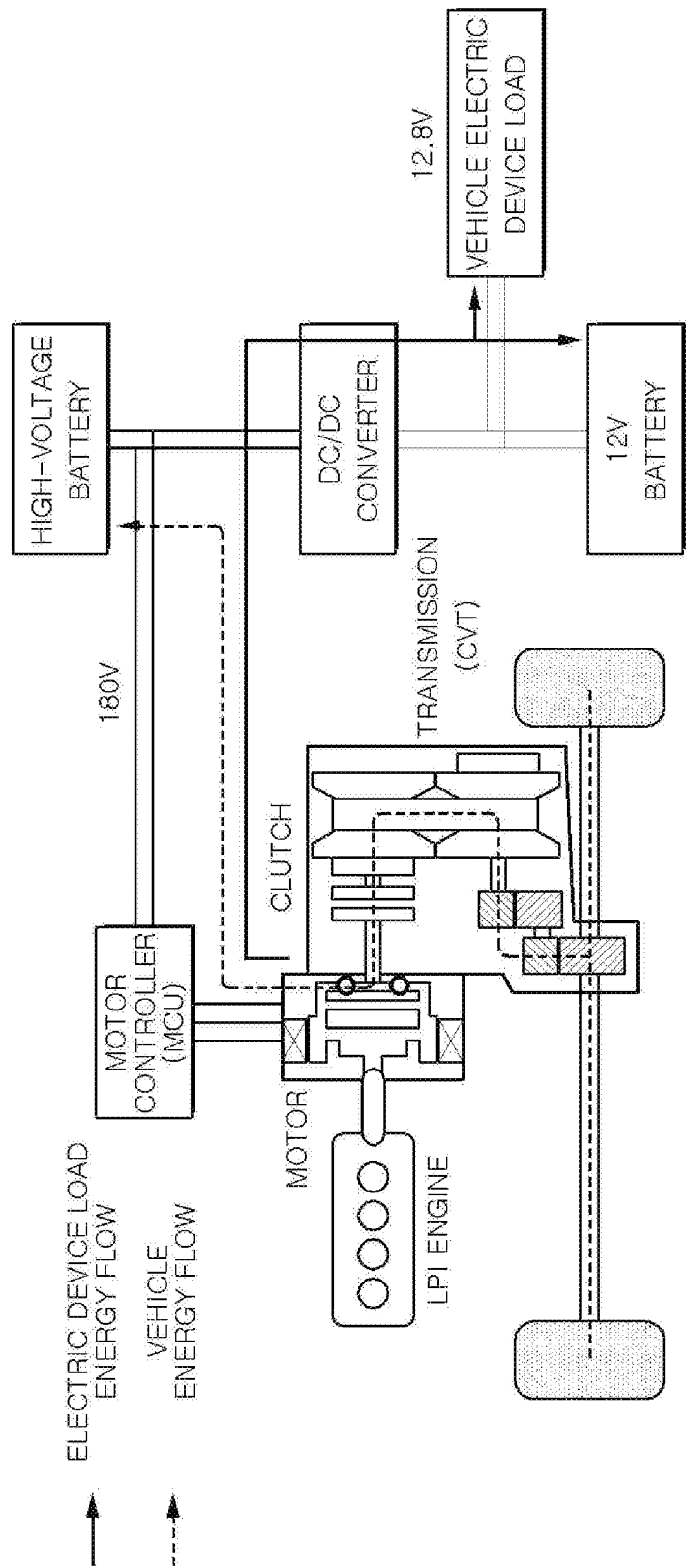
FIG. 6 illustrates an electric device load energy flow and a vehicle energy flow, when the vehicle is a deceleration state.

Referring to FIG. 6, in the deceleration state, power is generated in the motor by recycling braking, by which the main battery is charged. Meanwhile, the generated energy is used for charging both the main battery and the sub-battery, and the energy corresponding to the electric device load of the vehicle is supplied. In this operation, the sub-battery is charged at high efficiency by a high-voltage control (e.g. 14.1V).

In order to supply power to electronic devices of a vehicle, it is possible to: use the power of the main battery or the sub-battery; directly use the power generated by the motor without using the main battery or the sub-battery; or directly use the power for charging the main battery generated in the recycling braking, depending on the charged conditions of the main battery. Meanwhile, when an air conditioner of the vehicle is turned on, a control is performed at the reference voltage when the gear is positioned at the P-stage or the N-stage, and when the gear is positioned in the other stages, the control is performed at the low voltage when the amount of blowing is the maximum, and alternately performed at the low voltage and the reference voltage when the amount of blowing is not the maximum. Accordingly, it is possible to appropriately distribute the ratio of the sections occupied by the low-voltage control and the reference-voltage control throughout the control.

Further, when at least one headlamp is turned on, the control is performed at the reference voltage to prevent changes in brightness of light due to changes in voltage. However, when the changes in brightness of light due to the changes in voltage are very small, the low voltage or the high voltage may be included in certain parts.

Further, in case of operating at least one window wiper, the control is performed at the reference voltage to prevent changes of the wiper operation due to changes in voltage. However, similar to the case of the headlamp, the low voltage or the high voltage may be included in certain parts.

Figure 7A:
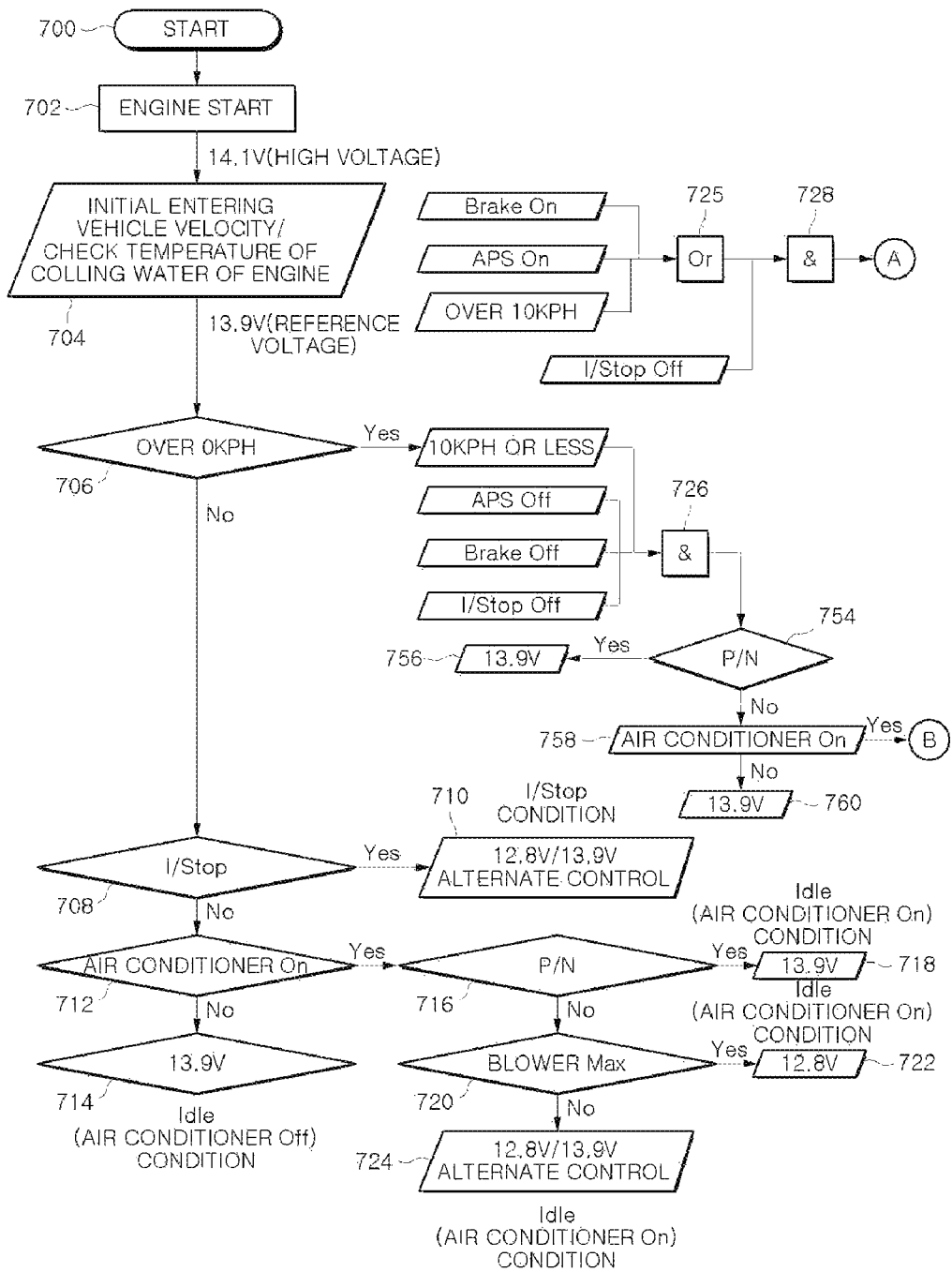
FIG. 7 is a block diagram illustrating a variable voltage control method according to an embodiment of the present invention.
Figure 7B:
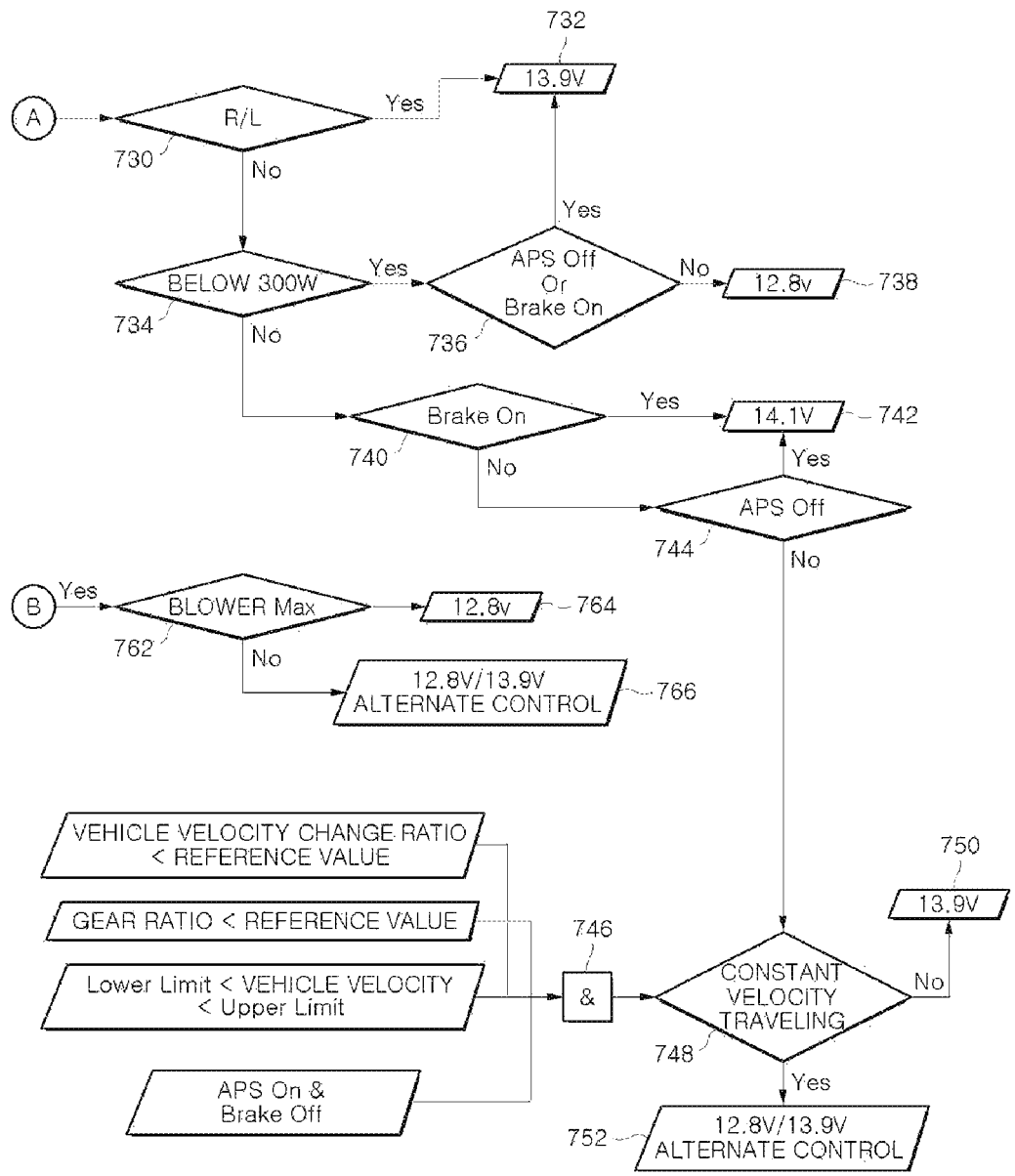

The variable voltage control method according to an embodiment of the present invention is described with reference to FIG. 7.

It is determined whether a vehicle is in the idle/stop state (708). If it is determined that the vehicle is in the idle/stop state, a control is alternately performed at a low voltage and a reference voltage (710).

When it is determined that the vehicle is not in the idle/stop state and an air conditioner of the vehicle is turned off, the control is performed at the reference voltage (714). On the other hand, when the vehicle is not in the idle/stop state and the air conditioner is turned on, the status of the gear of the vehicle is determined (716). When it is determined that the gear is at P-stage or N-stage, the control is performed at the reference voltage (718). When it is at traveling stages, such as D-stage, R-state, and L-stage and the amount of blowing of the air conditioner is maximal, the control is performed at the low voltage while reducing the load of the engine (722). Meanwhile, when the amount of blowing of the air conditioner is not maximal, the control is alternately performed at the low voltage and the reference voltage to improve the efficiency of energy use (724).

It is determined whether the vehicle is at a predetermined velocity (e.g. 10 KPH) or lower (706). When the vehicle is at the predetermined velocity or lower (706) and the Accel Position Sensor (APS), the brake, and the idle/stop are off (726), the status of the gear is determined (754). When the gear is at P-stage or N-stage, the control is performed at the reference voltage (756). When it is at the traveling stages, such as D-stage, R-stage, and L-stage and the air conditioner is turned on (758) and the amount of blowing is maximal (762), the control is performed at the low voltage to reduce the load of the engine (764). If the amount of blowing is not maximal even if the air conditioner is turned on the control is alternately performed at the low voltage and the reference voltage (766). Meanwhile, when the air conditioner is turned off, the control is performed at the reference voltage (760).

It is determined whether the vehicle is in the constant velocity traveling state (748). When the vehicle is in the constant velocity traveling state and when the vehicle velocity change ratio is a reference value or lower, the gear ratio is a reference value or lower, the vehicle velocity is within a predetermined range, the APS is on, and the brake is off, the control is alternately performed at the low voltage and the reference voltage (752).

On the other hand, if the brake is on, the APS is on, or the vehicle velocity is greater than the predetermined value (e.g., 10 KPH) (725) and when the idle/stop is off (728), it is determined whether the gear is at R-stage or L-stage (730). If it is determined that the gear is at R-stage or L-stage, the control is performed at the reference voltage (732). When the gear is at the other stages, it is determined whether the electric device load is below a predetermined level (e.g., 300 W) (734). If it is determined that the electric device load is smaller than the predetermined level, it is determined whether it is a deceleration condition (736). If it is determined that the brake is on or the APS is off, the control is performed at the reference voltage (732), and if it is determined that the APS is on and the brake is off, the control is performed at the low voltage (738). On the other hand, if it is determined that electric device load is larger than the predetermined level, it is determined whether it is the deceleration condition (740). When it is determined that the brake is on or that the brake is off and the APS is off, the control is performed at the high voltage (742). When it is determined that the brake is off and the APS is on (744) and it is determined that the vehicle is not in the constant velocity traveling state (748), the control is performed at the reference voltage (750).

The systems and methods according to the present invention can provide various advantages. For example, it is possible to improve the fuel efficiency by changing the voltage while preventing the sub-battery from discharging, and achieve variable controls in various sections of vehicle driving states. Further, since both the sub-battery and the main battery deals with the electric device load at the idle/stop, errors can be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable voltage control system for a hybrid vehicle, the system comprising:
   a main battery for storing high-voltage power to be supplied to a motor of the vehicle;
   a sub-battery for storing low-voltage power to be supplied to electronic devices of the vehicle;
   a low-voltage DC/DC converter (LDC) for converting the high-voltage power of the main battery into the low-voltage power to be supplied to the electronic devices;
   a power controller for controlling the main battery, the LDC, and the sub-battery,
   wherein the power controller performs variable voltage control using a low voltage, a reference voltage higher than the low voltage, and a high voltage higher than the reference voltage in accordance with an idle stop state, a constant velocity traveling state, an acceleration state, and a deceleration state of the vehicle; and
   an air conditioner of the vehicle,
   wherein when the air conditioner is turned on the power controller performs the controlling of the main battery, the LDC, and the sub-battery at the reference voltage when a gear is at a parking position or a neutral position, at the low voltage when the gear is at other stages and an amount of blowing is maximal, and at the low voltage and the reference voltage when the gear is at the other stages and the amount of blowing is not maximal.

2. The system as defined in claim 1, wherein the control by the power controller is performed:
   alternately at the low voltage and the reference voltage, when the vehicle is in the idle stop state;
   alternately at the low voltage and the reference voltage, when the vehicle is in the constant velocity traveling state;
   at the low voltage if the power required for the electronic devices is not higher than a predetermined value, and at the reference voltage if the power required for the electronic devices is higher than the predetermined value, when the vehicle is in the acceleration state; and
   at the high voltage when the vehicle is in the deceleration state,
   wherein control time of the alternate control is variable.

3. The system as defined in claim 1, wherein when at least one headlamp of the vehicle is turned on or at least one wiper of the vehicle is operated, the control by the power controller is performed at the reference voltage.

4. The system as defined in claim 1, wherein, the control by the power controller is performed such that the power from the main battery or the sub-battery can be supplied to the electronic devices, the power generated by the motor can be supplied to the electronic devices without using the power from the main battery or the sub-battery, or the power for charging the main battery can be supplied to the electronic devices depending on charging state of the main battery.

* * * * *